United States Patent [19]

Parkinson

[11] 4,045,232
[45] Aug. 30, 1977

[54] PRINTING INK COMPOSITION

[75] Inventor: Harold B. Parkinson, Gardner, Ill.

[73] Assignee: Topar Products Corporation, Gardner, Ill.

[21] Appl. No.: 520,164

[22] Filed: Nov. 1, 1974

Related U.S. Application Data

[63] Continuation-in-part of Ser. No. 414,872, Nov. 12, 1973, abandoned, which is a continuation-in-part of Ser. No. 201,242, Nov. 22, 1971, abandoned.

[51] Int. Cl.$^2$ .................. C08D 11/06; C08L 91/00
[52] U.S. Cl. .................. 106/28; 260/22 R; 260/22 T
[58] Field of Search ............. 106/27–32, 106/250, 252, 263; 260/18 VP, 22 T; 148/611, 624; 101/465, 466, 468

[56] References Cited

U.S. PATENT DOCUMENTS

| 792,113 | 6/1905 | Blakeman, Jr. | 106/250 |
| 1,549,859 | 8/1925 | Fabian | 101/466 |
| 1,886,817 | 11/1932 | Johnston | 101/466 X |
| 2,185,967 | 1/1940 | Priester | 106/250 X |
| 2,260,140 | 10/1941 | Ginn | 260/18 VP X |
| 2,988,988 | 6/1961 | Kurz | 101/451 |
| 3,333,975 | 8/1967 | Clark et al. | 106/252 |
| 3,333,977 | 8/1967 | Penoyer | 106/263 X |
| 3,373,115 | 3/1968 | Steppan | 101/465 X |
| 3,595,653 | 7/1971 | Steppan | 101/466 X |
| 3,745,028 | 7/1973 | Rauner | 101/451 X |
| 3,798,098 | 3/1974 | Ogawa et al. | 106/32 X |
| 3,803,070 | 4/1974 | Spencer | 106/20 |

Primary Examiner—J. Ziegler
Attorney, Agent, or Firm—Fitch, Even, Tabin & Luedeka

[57] ABSTRACT

An additive is provided which may be combined with printing inks to provide a printing ink composition which is retentive only by the image portion of a print plate. The additive includes a printing ink resin and a concentrated mineral acid. The additive may also include a polyhydric or monohydric alcohol or mixtures of such alcohols. A volatile solvent may also be present in the additive.

22 Claims, No Drawings

PRINTING INK COMPOSITION

The present invention is a continuation-in-part of application Ser. No. 414,872, filed Nov. 12, 1973, which is continuation-in-part of application Ser. No. 201,242, filed Nov. 22, 1971, both abandoned.

The present invention relates generally to improvements in printing ink compositions and more particularly relates to providing an improved printing ink composition which may be used in a single step lithographic printing process without the necessity for applying moisture to the lithographic plate between each successive printing operation.

Lithographic printing, which includes offset printing, photolithography, photo-offset printing, lithography and planography, is the process in which the printing surface is without appreciable relief or depression, the image area being ink-receptive and the non-image area being water-receptive. As used herein, the term "lithographic printing" refers to all those printing methods in which the printing surface is without appreciable relief or depression. Lithographic printing is distinguished from letter press printing, wherein raised type or image surfaces are used to transfer ink to a printing surface.

In lithographic printing, the non-image areas are first moistened with water or other material to make them ink-repellant, the image areas are then inked by means of rollers and the ink is finally transferred by pressure to a receiving surface. Direct lithography involves a direct transfer of ink from a flat or cylindrical stone or plate to the material being printed. Offset lithography embodies an additional cylinder covered with a rubber blanket which is interposed between the plate cylinder and impression cylinder. Thus, in offset lithography, the ink is transferred first from the plate cylinder to the rubber blanket of the offset cylinder and from there to the paper or other material passing between the offset cylinder and the impression cylinder.

By far the most lithographic printing is now done from zinc and aluminum plates. The compositions and method of the present invention are particularly suitable for use with zinc and aluminum plates, but may also be used with other types of lithographic plates, such a stone plates, bimetal plates, paper plates and plastic plates. The compositions of the invention may also be used with raised surface printing methods, such as letter press printing. The compositions of the invention are particularly suitable for use with a combination of raised surface printing and lithographic printing.

Various methods are used to apply an image to be printed onto the surface of a plate. The image may be made by drawing in reverse directly on the surface of the plate by hand with a greasy or waxy crayon, or by pen or brush with liquid greasy ink. The usual method, however, is to make a contact print from a negative or positive transparency onto metal or bimetal plates which have been sensitized by the application of a colloidal protein such as egg albumin, casein or soy bean protein sensitized with ammonium dichromate.

The preparation of zinc plates is typical, and is described below for reference purposes. A grained zinc plate is first cleaned or counter-etched to remove dirt and any surface corrosion by a light etch with dilute hydrochloric acid or dilute acetic acid. The plate is then rinsed thoroughly with water. The plate may then be pre-etched with an aqueous mixture of a hydrophilic gum, such as gum arabic or carboxy methylcellulose, phosphoric acid and a salt, such as ammonium dichromate or magnesium nitrate. Pre-etching coats the plate with a very thin insoluble but hydrophilic film of adsorbed gum which aids in later development. The plate is then coated with a light sensitive surface coating consisting of a colloidal protein, such as egg albumin, casein, or soy bean protein which has been sensitized with ammonium dichromate. The plate is then contact printed through a photographic negative or positive transparency by means of exposure to a strong arc light. An ink-receptive image base is then applied by coating the plate first with a thin layer of resin or lacquer and then with a layer of greasy ink which is rubbed on thin and dried. The exposed plate is developed by immersing the plate in water or dilute ammonia until the coating softens. The coating and its ink layer is then removed from the unexposed areas by light rubbing under running water. The exposed area, which has been hardened by exposure to the strong arc light, remains behind with its attached ink layer and constitutes the printing image.

While the non-image areas of the plate appear clean, they still retain a residual film of the protein. The non-image areas must be desensitized by removing this residual film of protein. The term "desensitizing" and "sensitizing" are terms commonly used in the lithographic printing art to signify low ink receptivity and its converse. Removal of the residual protein in the non-image area is often effected by application of the pre-etch aqueous mixture previously described. The plate surface is then further desensitized by applying a thin film of a gum arabic solution or a carboxy methyl cellulose solution to the plate surface. After application, the gum solution is rubbed down to a thin film that does not cover the inked image areas. The plate is then ready for the printing press.

The above-described method for preparing a plate for use in lithographic printing provides a plate that is suitable for a two-step printing process wherein the prepared plate is first coated with a film of water which adheres to the non-image portions of the plate and secondly, a coating of greasy ink is applied to the plate. The greasy ink adheres to the image areas of the plate that repel the water coating. A sheet of paper or other flexible material then being placed upon the plate will take up the printing ink from the design thereon producing a print of the design upon the paper. This method requires the repetition of water coating and an ink coating successively applied to the plate for each printing.

Various methods have been proposed to obviate the necessity of applying a water coating to the surface of the printing plate. In this connection, it has been proposed to treat the non-image areas of printing plates with solutions containing certain salts and glycerin and to print with inks containing similar solutions emulsified therein. It has also been proposed to render the entire surface, or preferably only the non-image portion of the surface, of a printing plate glycerin receptive and thereafter to coat the non-image portion of the printing plate with a thin layer of glycerin. The first of these proposed methods is objectionable in that ink emulsions containing glycerin have been unstable and tend to break so that the glycerin is free to wet the ink distributing rolls and thus prevent uniform distribution of the ink. Moreover, inks containing glycerin and/or hygroscopic salts tend to be very slow drying and may remain tacky to the touch for weeks or even months after printing. The second of the above-proposed methods for applying a thin film of glycerin to a glycerin-receptive non-image surface is also objectionable in that the glycerin must be repetitively applied, preferably after each successive inking of the roll.

It has also been proposed to provide an ink composition having image area receptive portions and non-image area receptive portions incorporated into the same ink body. Such compositions would be ideal in that a single ink composition can be applied once to the printing roll and alternate applications of water or glycerin would not be required. However, such proposed ink compositions have not been satisfactory in that definition and toning suffer after only a few printings have been taken from the printing roll.

It would be desirable to provide a printing ink composition that may be used in a single application step and which provides an ink coating only on the image portion of a printing plate. It would be particularly desirable to provide a printing ink composition which may be used through extended runs of the printing press and which does no bleed or tone onto the non-image portions of the printing plate.

Accordingly, it is a principal object of the present invention to provide a printing ink composition which may be used without separate water coating or glycerin coating of the non-image portion of a printing press. It is another object of the present invention to provide an improved vehicle used to provide a printing ink composition that may be used without moistening or otherwise treating the non-image area of a printing plate between successive inkings. It is a further object of the present invention to provide a printing ink composition that may be used for an extended printing run, the ink portion of which composition is retentive only by the image portion of a printing roll. It is a further object of the present invention to provide a method of preparing improved vehicle which may be used as an additive for printing inks. Still another object of the present invention is the provision of a lithographic ink composition consisting of a material having an affinity for greasy substances and other material repellent to greasy substances.

These and other objects of the present invention will become more apparent from the following detailed description.

Generally, in accordance with various features of the present inventon, an acid modified vehicle is provided which is used to prepare printing inks with improved properties. The vehicle comprises an acid treated resin, an alcohol and a solvent. Minor amounts of water may also sometimes be present in the vehicle and minor amounts of water are sometimes beneficial when the vehicle is used in certain inks, such as fluorescent inks.

Printing ink is a fluid or semi-fluid colored material consisting of a color body, usually referred to as a pigment, and a carrying vehicle which is used to distribute the pigment onto the image area of a printing plate. A binder, which may be a constituent of the vehicle, is used to protect the pigment after its deposition onto the surface which is printed. Various inorganic and organic pigments are used in the preparation of printing inks. Other processed natural mineral materials are used as fillers in some inks, the most important filler being clay, purified either by air flotation or by water washing.

The most important solid vehicle constituents of printing ink compositions are resins. Both natural and synthetic resins are used in the preparation of printing inks, and the use of a wide variety of resins is well known. Such resins include untreated resin, heat polymerized resin, bodied linseed oil, a wide variety of damars and copals, cumarone indene resins obtained by polymerization of the indene fraction of coal-tar distillates polyturpene resins obtained by polymerization of turpenes, phenol-modified cumarone-indene resins, petroleum resins prepared by polymerization of unsaturated petroleum hydrocarbon fractions or residues, phenolic resins, obtained by treating the polymerization products of phenols and formaldehyde with resin, alkyd resins obtained by treating polyfunctional alcohols, such as glycerol, cellulose derivatives, such as nitrocellulose, chlorinated rubber and mixtures of these resins which are all sometimes used in the manufacture of printing inks. Various waxes, greases and polyethylene are also sometimes used in printing ink compounds to modify their working properties.

The resin portion of the vehicle of the present invention may be any resin normally used or which has been used in the manufacture of printing ink as described above, which is fluid and which has a viscosity of 72° F in the range of from about Q to about Z6 as determined by the Gardner-Holdt viscosity standards. This corresponds to a viscosity in the range of from about 5 to about 200 poises. Resins which are solids at room temperature or which can be made liquid only by dispersion in a solvent for the resin cannot be used. It is preferred that no solvent be present during the acid treatment of the resin, as hereinafter defined. Preferred resins are bodied drying oils and alkyd resins.

As used herein, the term "drying oil" refers to liquid substances, both natural and synthetic that are converted by the action of the oxygen of air to a dry, hard, resinous material. Drying oils useful as the resin in the present invention are those drying oils having an Iodine No. of from about 110 to about 210 and a Saponification No. of from about 180 to about 200. Suitable drying oils include linseed oil, soybean oil, tung oil, dehydrated castor oil, oiticica oil, perilla oil, safflower oil, menhaden oil and sardine oil. The term "bodied" refers to the treatment of drying oils to polymerize the dry oil and increase the viscosity thereof. Bodying of drying oils is usually effected by thermal treatment of the drying oil in the presence of a catalyst, such as a metallic oxide. It should be understood that the drying oils suitable for use as the resin in the modified vehicle of the present inventon have had their viscosity increased to within the range indicated above by bodying the drying oil.

In accordance with the invention, the resin is acid treated by the addition of nitric acid or mixtures of nitric acid and sulphuric acid containing at least 50 percent by weight of nitric acid. No other mineral or organic acids are suitable for the acid treatment step of the present invention. In particular, phosphoric acid is not a strong mineral acid and is not suitable to effect acid treatment of the resin in accordance with the invention. It is believed that the treatment of a resin by nitric acid provides a novel and unique component for printing ink compositions. The nature of the reaction and the products formed during the reaction caused by the addition of nitric acid to the resin are not known.

It is preferred that the resin be heated prior to the initial addition of the acid, and in this connection it is preferred that the resin be heated to a temperature in the range of from about 100° F to about 200° F prior to the initial addition of acid. The acid is preferably used at a level of about 10 cc of acid per pound of resin, but the level of acid may be varied within the range of from about 5 cc of acid to about 20 cc of acid per pound of resin. In this connection, the level of addition of acid is based on undiluted acid and any aqueous dilution of the acid must be accounted for. It is preferred to use concentrated acid having at least about 50 percent acid.

After the acid is added to the resin, the mixture of resin and acid is vigorously agitated as the temperature of the mixture is increased to within the range of from about 170° F to about 200° F, preferably about 190° F. As the acid is added to the resin a foaming reaction is observed. It is preferred to add the acid in several increments so as to minimize the foaming which occurs. The agitation at the elevated temperature is continued until no further indication of a reaction is observed, preferably from about 15 minutes to about 3 hours. Thereafter, as discussed more fully hereinafter, an alcohol and a solvent are combined with the acid treated resin to provide the improved vehicle of the present invention.

While not wishing to be bound by any theory, it is believed that the acid treated resin provides the vehicle of the invention with properties that make the vehicle particularly suitable for use in the preparation printing inks. The working qualities of the printing ink in a press are determined by its flow characteristics. Lithographic inks are generally viscous liquids which must have a low yield value to flow under gravity in the ink fountain of the press. The ink viscosity must not be too high so that a proper ink transfer may be effected at the prevailing press speed from one roller to the next in a multiple roller distribution system. In the transfer phase of the ink from a plate to paper, the ink viscosity and tack are of importance. At the moment of impression, the printing pressure tends to displace the ink in a sideways direction. Such a displacement frequently causes a distortion of the elements of reproduction and in order to counteract this tendency, viscous ink is desirable. Upon separation of ink and paper, a force is exerted upon the paper by the ink film. If the ink is too tacky, parts of the paper surface may be torn.

A complicating factor is that printing inks are non-Newtonian plastic bodies whose viscosity depends upon the shearing stress to which they are subjected. It is believed that the acid treated resin of the vehicle of the present invention, when the vehicle is used in printing ink, provides the printing ink with suitable properties in respect to viscosity, tackiness and drying properties while still permitting the alcohol in the vehicle to be displaced from the ink and to occupy the non-image areas of the plate.

The vehicle of the invention is particularly suitable for use with lithographic printing inks. However, the vehicle also may be used as an additive for printing inks intended for use in other types of printing, such as letter press inks. In this connection, a letter press ink containing the vehicle has improved drying properties which prevents offset printing by one printing sheet to another when the printed sheets are stacked A polyhydric alcohol is added next to the acid treated resin at a level of from about 25 to about 550 cc per pound of resin. After addition of the polyhydric alcohol, the mixture of polyhydric alcohol and acid treated resin is heated to a temperature in the range of from about 160° F to about 200° F while being vigorously agitated. The agitation is continued until the mixture appears to be homogeneous, usually in from 1 to 30 minutes.

The polyhydric alcohol is the principal component of the finished printing ink composition of the invention, for providing desensitization of the non-image areas of the printing plate. While the polyhydric alcohol and acid treated resin mixture appears to be uniform, it is believed that the polyhydric alcohol, in combination with the acid treated resin, is in an unstable relationship with respect to a printing ink containing the vehicle. It is further believed that the polyhydric alcohol preferentially separates from the ink and coats the non-image areas of the printing plate and also aids in drying the ink.

The polyhydric alcohol is preferably a short chain polyol having from two to five carbon atoms. Particularly preferred polyols are glycerin, ethylene glycol, propylene glycol and mixtures thereof. For some uses where particularly fast drying is desired, such as in letter press printing, the polyhydric alcohol may be combined with a short chain alcohol having from one to five carbon atoms. Preferred alcohols for such uses are methanol, ethanol, propanol and isopropanol.

The polyhydric alcohol is usually used at a level of about 900 cc per pound of acid treated resin in the finished printing ink composition but may be used at a level within the range of from about 450 cc to about 1350 cc of the polyhydric alcohol per pound of acid treated resin. In this connection, as indicated above, from about 25 to about 550 cc of the polyhydric alcohol per pound of resin are preferably used in the preparation of the vehicle of the invention. The remaining polyhydric alcohol is added during subsequent steps in the preparation of a printing ink composition including the vehicle.

A solvent is used in the vehicle to control the ultimate viscosity of the printing ink composition which is prepared including the vehicle. The solvent may be any volatile solvent normally used in the preparation of printing ink. The solvent is used at a level of from about 60 to about 450 cc per pound of acid treated resin in the finished ink composition. The solvent is preferably used at a level of from about 30 to about 300 cc in the vehicle and additional solvent may be used during the preparation of ink composition including the vehicle. The level of solvent added depends on the desired viscosity of the final printing ink composition.

Preferred solvents are turpentine, mineral spirits, short chain esters and mixtures thereof. By the term "short chain esters" is meant those esters having an aliphatic acid moiety of from 2 to 6 carbons and an aliphatic alcohol moiety of from 2 to 6 carbons. Both the acid moiety and the alcohol moiety may be straight or branched chain. The solvent should have a vapor pressure less than that of kerosene or it tends to evaporate too quickly from printing ink containing the vehicle when the printing ink stands prior to application of the printing ink. The solvent preferably has a boiling point in the range of from about 75° C to about 200° C. Preferred solvents are turpentine, mineral spirits and amyl acetate and a particularly preferred solvent is amyl acetate.

As heretofore described, the additive of the present invention is suitable for use with most colored inks to provide ink compositions which are adapted for one-step lithographic printing without separate application of water. When used with black ink and some colored inks, however, there is some tendency for the printing ink composition to tone or smudge the non-image areas of the printing plate. In a preferred embodiment of the present invention, the portion of the solvent used in the vehicle is acid treated prior to or after adding the solvent to the vehicle but prior to using the vehicle to prepare a finished printing ink composition. Also, the solvent may be acid treated concurrently with the resin by adding a portion of the acid to the resin followed by alternate and successive additions of solvent, polyhydric alcohol and the balance of the acid.

Acid treatment of the solvent is effected by adding a strong mineral acid to the solvent and heating the solvent to a temperature in the range of from about 120° F to about 390° F. Suitable strong mineral acids are nitric acid and sulphuric acid. A preferred acid is sulfuric acid and a preferred solvent is amyl acetate. The strong mineral acid is added to the solvent at a level of from about 0.05 percent to about 5 percent undiluted acid by volume, based on the volume of the solvent.

The acid treated solvent may be substituted for all or part of the total solvent in the printing ink composition. In this connection, for black ink and some dark colored inks, it is preferred that all of the solvent in the vehicle be acid treated solvent.

The solvent in the vehicle may be acid treated after the solvent is added to the vehicle. In this method for acid treatment of the solvent, the solvent and the acid are added to the homogeneous mixture of polyhydric alcohol and acid treated resin. Thereafter the temperature of the mixture is maintained in the range of from about 150° F to about 200° F while the mixture is stirred for a period of from about 1 minute to about 30 minutes.

As indicated, the presence of a slight amount of water is not deleterious and may in some cases be preferred. Water, if present, should not exceed about 300 cc of water per pound of acid treated resin in the finished printing ink composition. As indicated, printing ink compositions comprising the vehicle may be used in a lithographic printing operation without separate water coating onto the non-image portion of the printing press. It should be understood, however, that it is also contemplated to use printing ink compositions comprising the vehicle with separate addition of water to non-image portions without any deleterious effect. In this connection, when separate addition of water is used, the water may be plain tap water without addition of customary modifying agents, such as acids, gum or alcohols.

It should be understood that after the resin has been acid treated the sequence of steps and additions of components is not important to provide the vehicle of the invention with improved properties. As described the sequence of steps is usually as follows: (1) acid treatment of resin; (2) blending of acid treated resin with a polyhydric alcohol; (3) blending of mixture of acid treated resin and polyhydric alcohol with a solvent; and (4) acid treatment of solvent. The acid treatment of the solvent may be effected either before or after adding the solvent to the vehicle. Moreover, the polyhydric alcohol and the solvent may be added in any sequence and may be added in alternate increments.

After the vehicle has been prepared, the vehicle is used to prepare a printing ink containing the vehicle at a level of from about 5 percent to about 50 percent by weight of the vehicle based on the weight of the finished printing ink composition. Preparation of a printing ink containing the vehicle is not difficult and may be effected by rapid agitation of the vehicle and the other components of the ink. The printing ink composition may be applied to a printing plate by means of a roller. A thin film of the ink portion of the printing ink composition is deposited upon the image portion of the plate. At least a portion of the printing ink is deposited upon the non-image portion of the printing plate, and a sharp definition of areas is obtained. The sharp definition is retained even during the printing of large editions.

The following examples illustrate various features of the present invention, but are intended to in no way limit the scope of the invention, which is defined in the appended claims.

EXAMPLE I

A vehicle is prepared which is to be used to prepare a lithographic printing ink to provide a onestep printing ink composition. The vehicle contains the following ingredients at the indicated level:

| INGREDIENT | LEVEL |
|---|---|
| Alkyd resin (Gardner - Holdt) Viscosity - No. Z4) | 2 pounds |
| Concentrated nitric acid (Reagent grade-70% $HNO_3$) | 120 cc |
| Glycerin | 300 cc |
| Ethylene glycol | 126 cc |
| Amyl acetate | 128 cc |
| Turpentine | 120 cc |

The vehicle is prepared by combining the ingredients in the following sequence. The alkyd resin is first heated to a temperature of 150° F and is maintained at this temperature. 30 cc of nitric acid is added to the alkyd resin. A visible foaming reaction takes place upon the addition of the nitric acid, and the temperature of the resin is increased to 190° F. 200 cc of amly acetate and 75 cc of glycerin are then added to the reaction mixture and the temperature is reduced to 150° F. An additional 30 cc of nitric acid is added, followed by addition of 150 cc of glycerin and 120 cc of turpentine.

The above indicated addition sequence is effected while the reaction mixture is being vigorously stirred. After the last ingredient has been added, the foaming has receded, and a stable, clear, amber colored vehicle is obtained.

The vehicle is combined with a lithographic printing ink at a level of 50 percent by weight of the vehicle based on the weight of the printing ink. The printing ink composition is then used in an offset lithographic press in a single-step printing method, that is, there is no application of water between successive printing ink applications. A run of 5,000 copies are made, using the printing ink composition described above. At the end of the run there is no toning or ink transfer to the non-image portions of the printing plate, and the definition of the printing is still sharp.

EXAMPLE II

A vehicle for printing inks having the same formulation as Example I is prepared with the exception that the temperature of alkyd resin is controlled at 180° F by placing the alkyd resin in a jacketed container and circulating heated water in the jacket of the container. The nitric acid is continuously and slowly added to the alkyd resin over a period of about 30 seconds as the resin is being stirred. A visible foaming reaction takes place but the temperature is maintained at 190° F. The remaining ingredients of the vehicle are then combined with the nitrated resin. After addition of the solvents, 15 cc of sulfuric acid (Reagent Grade-96% $H_2SO4$) are added and stirring is continued for 5 minutes.

EXAMPLE III

A printing ink is prepared utilizing the vehicle of Example II. The printing ink has the following formulation:

| CARBON INGREDIENT | WEIGHT PERCENT |
|---|---|
| Carbon Black | 6 |
| Turpentine | 6 |
| Vehicle | 88 |

The above printing ink formulation is used in an offset letterpress to print lightweight paper having the general characteristics of tissue paper. A run of 5,000 copies is made using the printing ink composition described above. At the end of the run the definition of the printing is still sharp.

EXAMPLE IV

A vehicle is prepared which is to be used to prepare a lithographic printing ink to provide a one-step printing ink composition. The vehicle contains the following ingredients at the indicated levels:

| INGREDIENT | LEVEL |
|---|---|
| Bodied linseed oil (Gardner - Holdt Viscosity-No. Z4) | 20 pounds |
| Nitric acid (Reagent grade-70% HNO$_3$) | 300 cc |
| Glycerin | 3000 cc |
| Amyl acetate | 2000 cc |
| Sulfuric acid (Reagent grade-96% H$_2$SO$_4$) | 50 cc |

The vehicle is prepared by combining the ingredients in the following sequence. The bodied linseed oil is first heated, while being agitated, to a temperature of 140° F. The nitric acid is added in 6 increments at 15 minute intervals to the bodied linseed oil and agitation is continued while the mixture is heated to a temperature of 180° F. The glycerin is added and the temperature is maintained at 190° F for 5 minutes with constant stirring. Agitation is continued for an additional 5 minutes. The sulfuric acid and amyl acetate are then added and the mixture is heated to 190° F over a period of 5 minutes with constant stirring. Stirring is continued for 5 minutes while the temperature is maintained at 180° F. The mixture is then allowed to cool under ambient conditions to provide the modified vehicle of the invention.

A base ink is then prepared. The base ink contains 1 part of carbon black, 3.5 parts of a varnish, available from Lanter Chemical Co. and identified as No. 935 modified gloss varnish, 0.5 parts of alkali blue toner, 0.25 parts of 6 percent cobalt drier, 1 part of bodied linseed oil having a viscosity No. of Z4 and 1 part of glycerin.

An acid treated solvent is then prepared. To prepare the acid treated solvent, 300 cc of amyl acetate are heated to a temperature of 200° F in a jacketed container. Five cc of 96 percent sulfuric acid is then added to the heated amyl acetate. Heating of the amyl acetate with continuous stirring is continued until the amyl acetate reaches a temperature of 260° F. The acid treated amyl acetate is then rapidly cooled by circulating water in the jacket.

A lithographic printing ink is then prepared. The lithographic printing ink contains 2 parts of the above described modified vehicle, 5 parts of the above described base ink, 2 parts of glycerin and 1 part of the above described acid treated solvent. The ingredients for the lithographic printing ink are combined and agitated for a period of 15 minutes. All parts and percentages are by weight unless otherwise specified.

The lithographic printing ink prepared in accordance with this example is then used in an offset lithographic press. Sharp, clear copies are produced and there is no toning or ink transfer to the non-image portions of the printing plate.

It will be appreciated that many variations and modifications of the method of preparing an additive and the components of the additive may be made which are still within the scope of the invention.

What is claimed is:

1. A modified ink vehicle for use in the preparation of printing ink compositions comprising a printing ink resin, a solvent and a strong mineral acid, said strong mineral acid being present at a level of from about 5 to about 20 cc per pound of resin, said printing ink resin being fluid and having a viscosity at room temperature in the range of from about Q to Z6 as determined by the Gardner-Holdt method, said strong mineral acid being selected from the group consisting of nitric acid and mixtures of nitric acid with sulphuric acid having at least about 50 percent by weight of nitric acid, said solvent being selected from the group consisting of turpentine, mineral spirits and short chain esters having a straight or branched chain aliphatic acid moiety of from 2 to 6 carbons and a straight or branched chain, aliphatic alcohol moiety of from 2 to 6 carbons.

2. An ink vehicle in accordance with claim 1 wherein said printing ink resin is selected from the group consisting of bodied drying oils and alkyd resins.

3. An ink vehicle in accordance with claim 2 wherein said bodied drying oils are selected from the group consisting of linseed oil, soybean oil, tung oil, dehydrated castor oil, oiticica oil, perilla oil, safflower oil, menhaden oil and sardine oil.

4. An ink vehicle in accordance with claim 3 wherein said resin is bodied linseed oil.

5. An ink vehicle in accordance with claim 1 which further comprises a polyhydric alcohol.

6. An ink vehicle in accordance with claim 5 wherein said polyhydric alcohol is a polyol having from 2 to 5 carbon atoms.

7. An ink vehicle in accordance with claim 6 wherein said polyol is selected from the group consisting of glycerol, ethylene glycol and propylene glycol.

8. An ink vehicle in accordance with claim 5 wherein said polyhydric alcohol is present at a level of from about 25 to about 550 cc per pound of resin.

9. An ink vehicle in accordance with claim 1 wherein said solvent is amyl acetate.

10. An ink vehicle in accordance with claim 1 wherein said solvent is present at a level of from about 30 to about 300 cc per pound of acid treated resin.

11. A printing ink composition comprising the modified ink vehicle of claim 1.

12. A method of making modified ink vehicle for use in printing ink compositions comprising providing a printing ink resin, said printing ink resin being fluid and having a viscosity at room temperature in the range of from about Q to about Z6 as determined by the Gardener-Holdt method, acid treating said resin by adding a strong mineral acid selected from the group consisting of nitric acid and mixtures of nitric acid with sulphuric acid having at least 50 percent by weight nitric acid to said printing ink resin and maintaining the temperature of said resin and acid mixture in the range of from about 170° F to about 200° F so as to acid treat said resin with said acid, said strong mineral acid being added to said resin at a level of from about 5 to about 20 cc of acid per pound of resin.

13. A method in accordance with claim 12 wherein said printing ink resin is selected from the group consisting of bodied drying oils and alkyd resins.

14. A method in accordance with claim 13 wherein said bodied drying oils are selected from the group consisting of linseed oil, soybean oil, tung oil, dehydrated castor oil, oiticica oil, perilla oil, safflower oil, menhaden oil and sardine oil.

15. A method in accordance with claim 14 wherein said resin is bodied linseed oil.

16. A method in accordance with claim 12 which further comprises adding polyhydric alcohol to said acid treated resin.

17. A method in accordance with claim 16 wherein said polyhydric alcohol is a polyol having from 2 to about 5 carbon atoms.

18. A method in accordance with claim 17 wherein said polyol is selected from the group consisting of glycerol, ethylene glycol and propylene glycol.

19. A method in accordance with claim 17 wherein said polyhydric alcohol is present at a level of from about 25 to about 550 cc per pound of resin.

20. A method in accordance with claim 12 which further comprises adding a solvent to said acid treated resin.

21. A method in accordance with claim 20 wherein said solvent is selected from the group consisting of turpentine, mineral spirits and short chain esters having a straight or branched chain aliphatic acid moiety of from 2 to 6 carbons and a straight or branched chain, aliphatic alcohol moiety and from 2 to 6 carbons.

22. A method in accordance with claim 20 wherein said solvent is present at a level of from about 30 to about 300 cc per pound of acid treated resin.

* * * * *